US009039020B2

(12) United States Patent
Ratz et al.

(10) Patent No.: US 9,039,020 B2
(45) Date of Patent: May 26, 2015

(54) END MEMBER AND GAS SPRING ASSEMBLY INCLUDING SAME

(71) Applicant: Firestone Industrial Products Company, LLP, Indianapolis, IN (US)

(72) Inventors: Michael E. Ratz, Avon, IN (US); Stephen C. Street, Carmel, IN (US); Paul P. Koeske, Fishers, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/043,064

(22) Filed: Oct. 1, 2013

(65) Prior Publication Data

US 2014/0091548 A1 Apr. 3, 2014

Related U.S. Application Data

(60) Provisional application No. 61/708,200, filed on Oct. 1, 2012, provisional application No. 61/713,472, filed on Oct. 12, 2012.

(51) Int. Cl.
*F16F 9/05* (2006.01)
*F16F 9/54* (2006.01)
*B60G 11/27* (2006.01)
*B60G 11/28* (2006.01)
(Continued)

(52) U.S. Cl.
CPC ............ *B60G 11/27* (2013.01); *B60G 17/0521* (2013.01); *B60G 11/28* (2013.01); *F16F 9/54* (2013.01); *F16F 9/052* (2013.01); *B60G 2206/424* (2013.01); *B60G 11/62* (2013.01);
(Continued)

(58) Field of Classification Search
CPC ........ B60G 11/27; B60G 11/28; B60G 11/62; B60G 11/465; B60G 17/0521; B60G 17/0485; B60G 2202/152; B60G 2204/126; B60G 2206/7104; B60G 2206/71042; B60G 2206/71043; B60G 2206/71044; B60G 2206/424; B66F 3/35; F16F 9/05; F16F 9/052; F16F 9/055; F16F 9/057; F16F 9/04; F16F 9/3207; F16F 9/0454; F16F 9/54
USPC ............. 280/124.157; 267/64.27, 122, 64.24, 267/64.23, 64.21, 35, 64.19, 118, 119, 256, 267/64.11, 64.28; 29/454, 890.09; 92/98 D, 92/90, 169.1; 188/298
See application file for complete search history.

(56) References Cited

U.S. PATENT DOCUMENTS

2006/0055094 A1* 3/2006 Attinello et al. ........... 267/64.27
2012/0200020 A1* 8/2012 Peeters et al. ................. 267/122

FOREIGN PATENT DOCUMENTS

WO WO 2007104671 A1 * 9/2007 ............. B60G 11/27

OTHER PUBLICATIONS

"What Is A Jounce Bumper?", Air Lift Company, http://www.airliftcompany.com/workshop/jounce-bumper/, Jul. 22, 2014.*

*Primary Examiner* — Keith Frisby
(74) *Attorney, Agent, or Firm* — Jason A. Houser; Fay Sharpe, LLP

(57) ABSTRACT

An end member for a gas spring assembly is dimensioned to receivingly engage an end of a flexible wall. The end member can be formed from polymeric material and can include a side wall receiving the end of the flexible wall. The end member can also include a base wall extending transverse to the side wall and dimensioned to abuttingly engage a jounce bumper of the gas spring assembly. The end member can include a mounting ridge or a mounting channel for engaging an associated structural component. A gas spring assembly including such an end member is also included.

20 Claims, 19 Drawing Sheets

(51) Int. Cl.
*B60G 17/052* (2006.01)
*F16F 9/32* (2006.01)
*F16F 13/00* (2006.01)
*B60G 11/62* (2006.01)

(52) U.S. Cl.
CPC .............. *F16F 9/3207* (2013.01); *F16F 13/002* (2013.01); *B60G 2202/152* (2013.01); *B60G 2204/126* (2013.01); *B60G 2204/4502* (2013.01); *B60G 2206/71* (2013.01); *B60G 2206/7101* (2013.01); *F16F 9/05* (2013.01)

END MEMBER AND GAS SPRING ASSEMBLY INCLUDING SAME

This application claims priority from U.S. Provisional Patent Application No. 61/708,200 filed on Oct. 1, 2012 and U.S. Provisional Patent Application No. 61/713,472 filed on Oct. 12, 2012, each of which is hereby incorporated herein by reference in its entirety.

BACKGROUND

The subject matter of the present disclosure broadly relates to the art of spring devices and, more particularly, to an end member for use in forming gas spring assemblies. A suspension system for a vehicle that includes one or more of such gas spring assemblies is also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a first or fully compressed condition and a second or fully extended condition. To eliminate contact between opposing portions of the sprung and unsprung masses, contact between opposing portions of components of the suspension system or contact between any combination thereof, jounce bumpers are commonly installed in one or more areas of the vehicle to prevent such opposing portions from directly impacting one another. Thus, during jounce motion of the suspension system, an opposing component will contact the jounce bumper rather than impacting the component on or near which the jounce bumper is mounted.

In some cases, it has been deemed desirable to reduce the overall weight of a vehicle suspension system. Reducing the weight of one or more of the end members of the one or more gas spring assemblies can be one contributing factor to achieving such a goal. As such, end members have been designed and constructed from polymeric materials to contribute to reduced suspension system weight. Additionally, such constructions may contribute to reduced cost of manufacture and/or other potentially desirable factors. However, it has been recognized that at least some known polymeric end member designs may be less than optimally suited for use in operation with jounce bumpers, such as under the conditions of use described above.

Notwithstanding the widespread usage and overall success of the wide variety of polymeric end member designs that are known in the art, it is believed that a need exists to meet these competing goals while still retaining comparable or improved performance, ease of manufacture, ease of assembly, ease of installation and/or reduced cost of manufacture.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
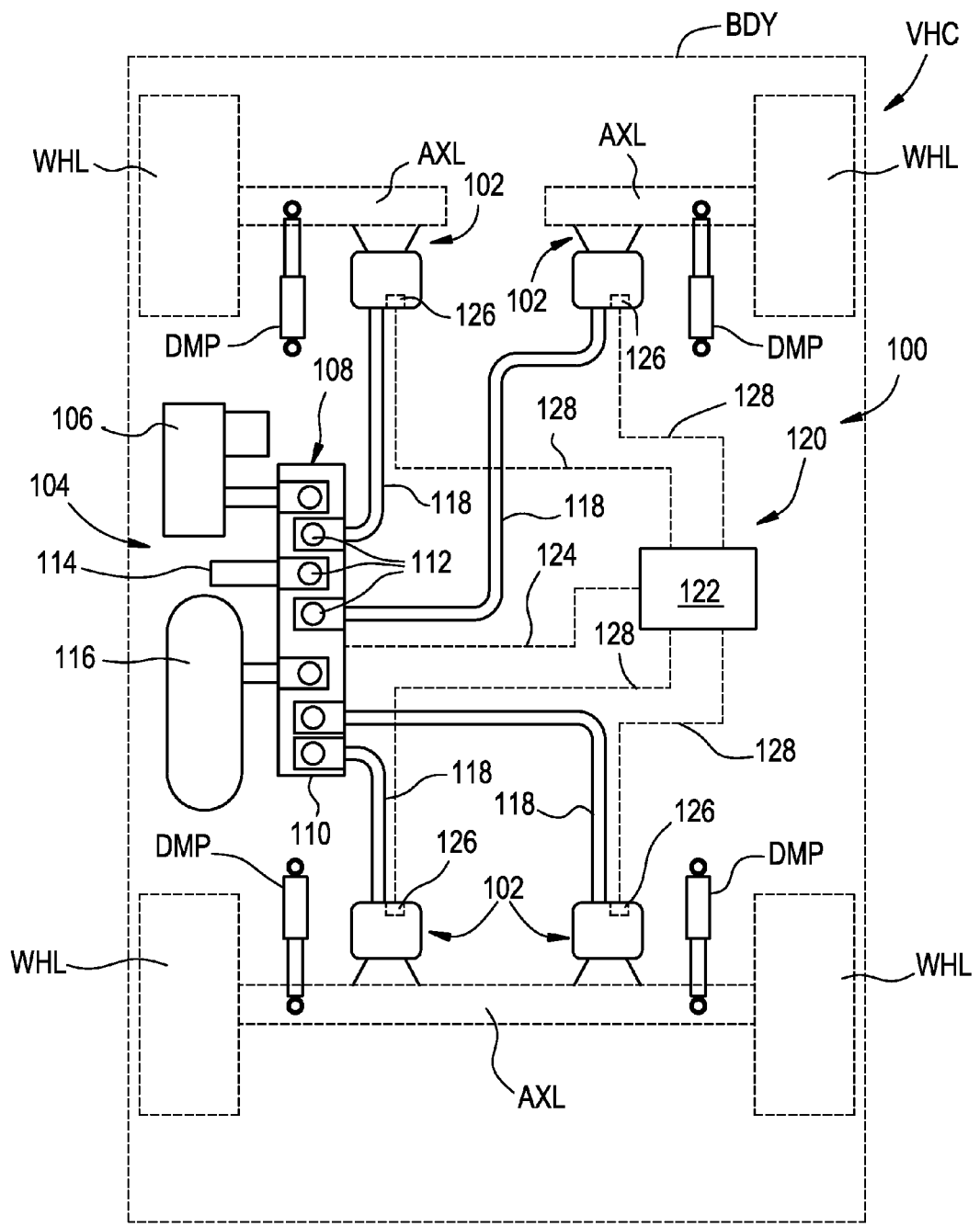
FIG. 1 is a schematic representation of one example of a suspension system of an associated vehicle including a gas spring assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also optionally include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices 126 can be in communication with ECU 122 in any suitable manner, such as through conductors or leads 128, for example. Additionally, it will be appreciated that the height sensing devices can be of any suitable type, kind and/or construction.

Figure 2:
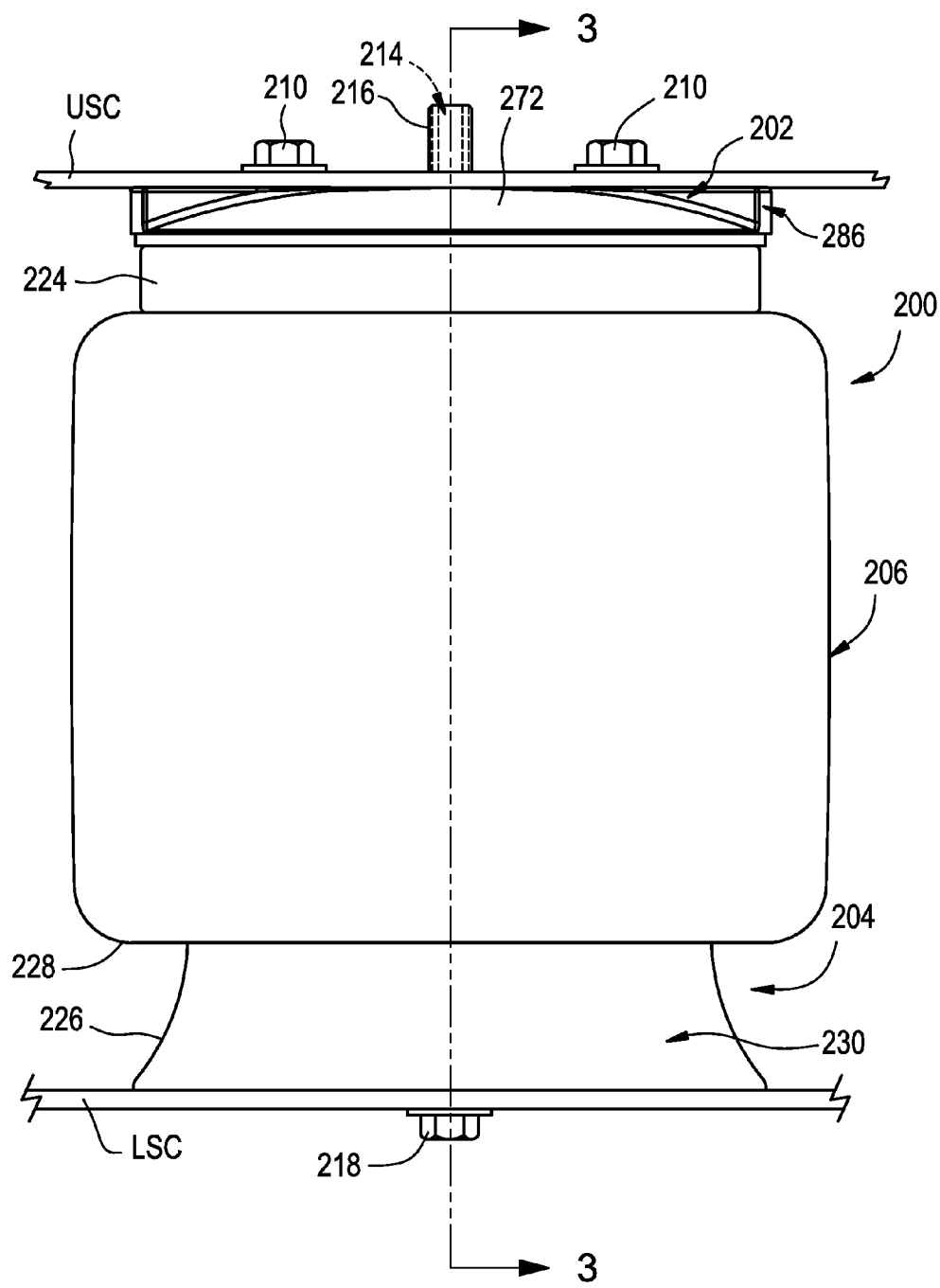
FIG. 2 is a side elevation view of one example of a gas spring assembly that includes one example of an end member in accordance with the subject matter of the present disclosure.
Figure 3:
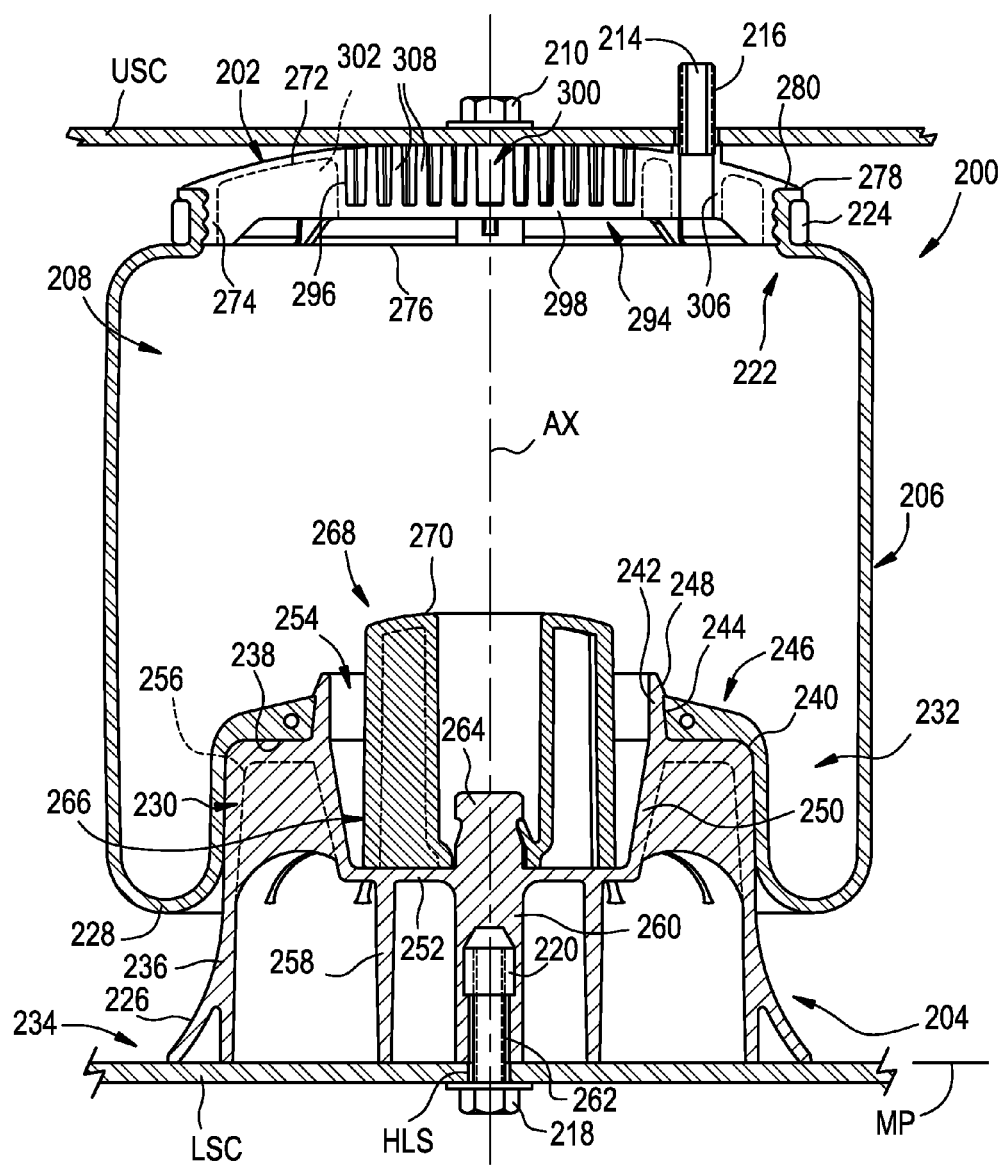
FIG. 3 is a cross-sectional side view of the gas spring assembly in FIG. 2 taken from along line 3-3 in FIG. 2.
Figure 4:
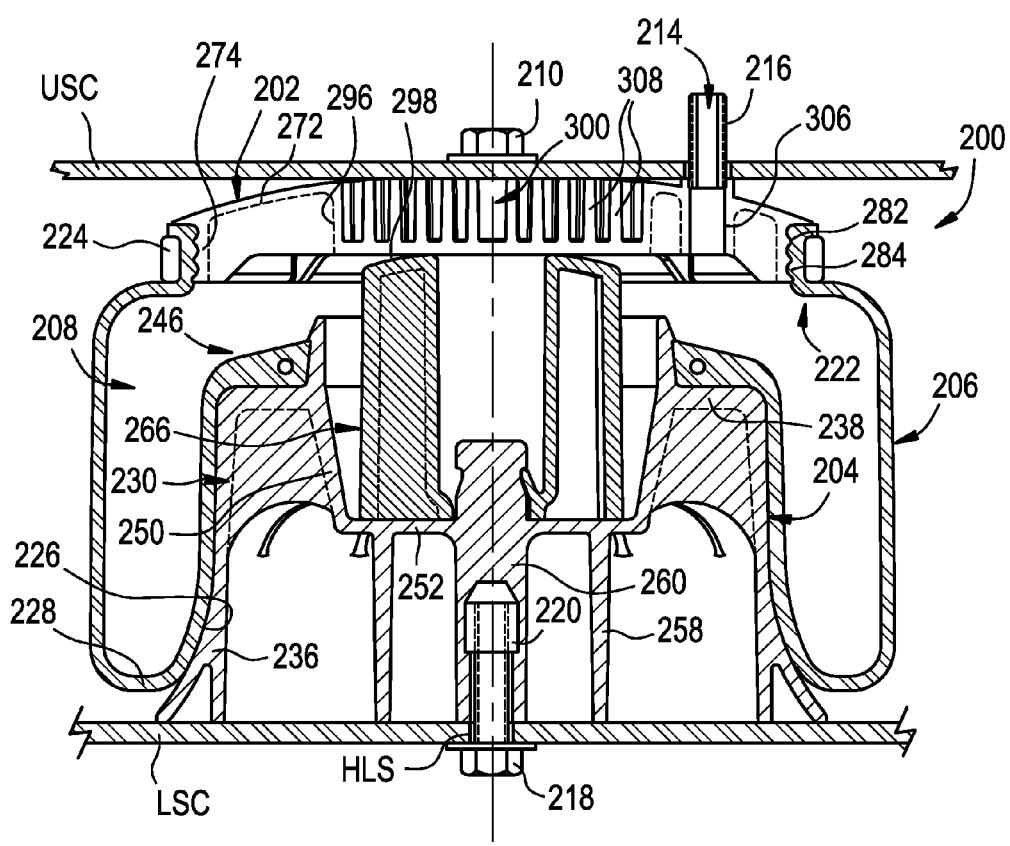
FIG. 4 is a cross-section side view of the gas spring assembly in FIGS. 2 and 3 shown in a compressed condition.

One example of a gas spring assembly 200 in accordance with the subject matter of the present disclosure is shown in FIGS. 2-4 as having a longitudinally-extending axis AX and can include one or more end members, such as an end member 202 and an end member 204 that is spaced longitudinally from end member 202. A flexible wall 206 can extend peripherally around axis AX and can be secured between the end members in a substantially fluid-tight manner such that a spring chamber 208 is at least partially defined therebetween.

Figure 5:
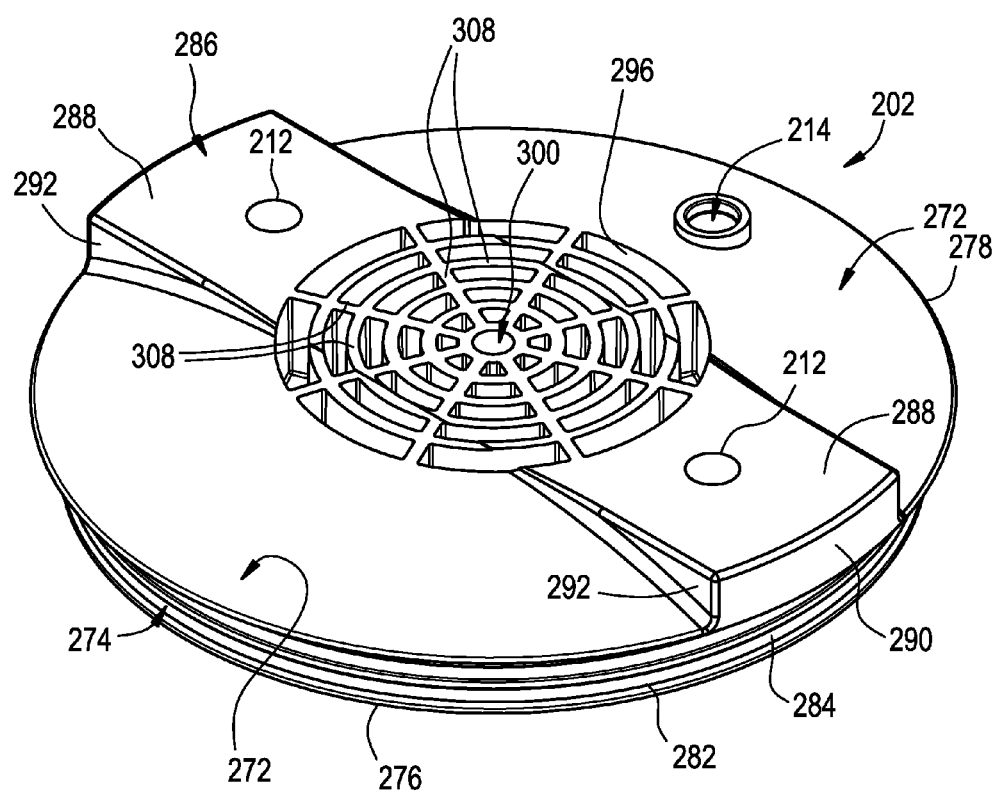
FIG. 5 is a top perspective view of the end member in accordance with the subject matter of the present disclosure shown in FIGS. 2-4.
Figure 6:
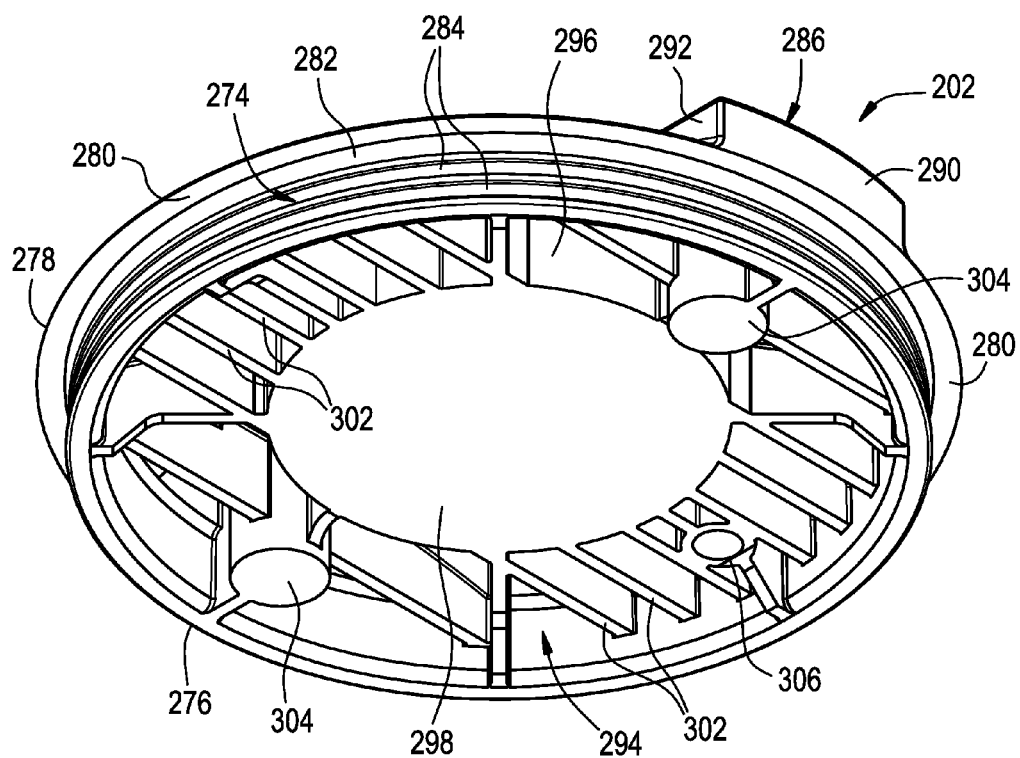
FIG. 6 is a bottom perspective view of the end member in FIGS. 2-5.
Figure 7:
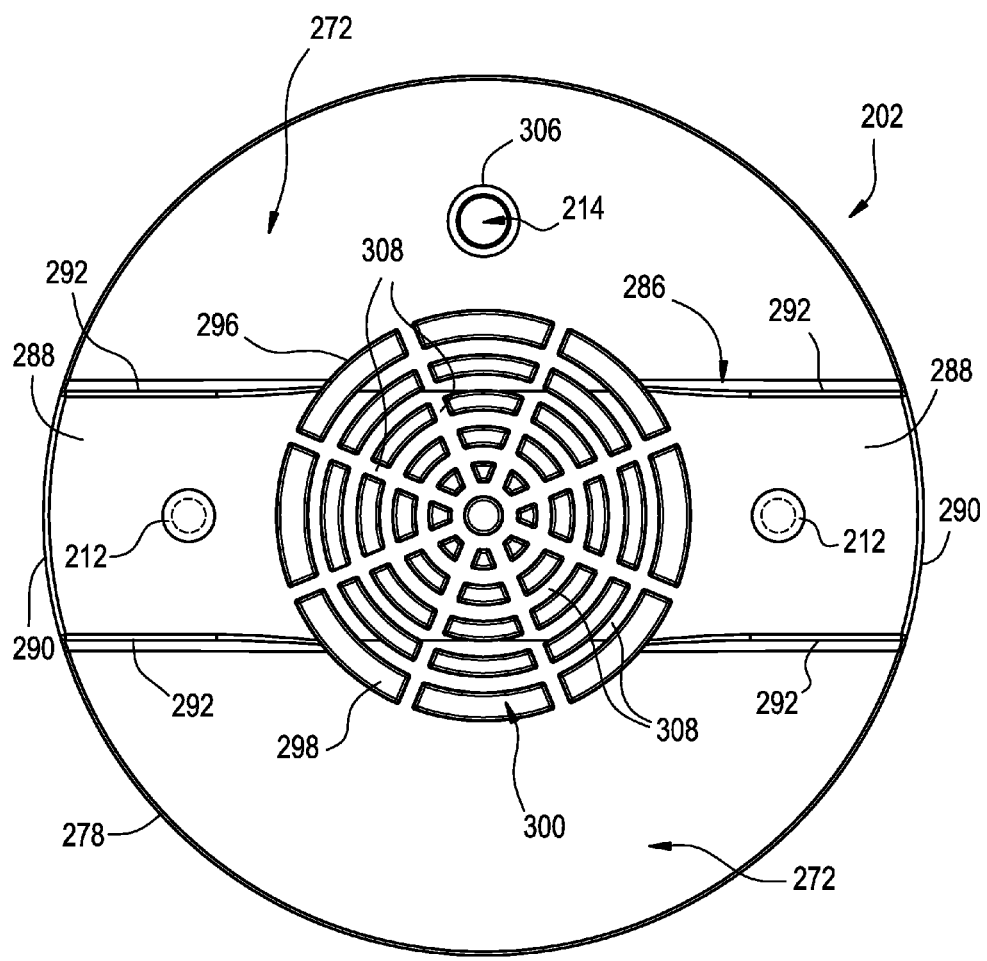
FIG. 7 is a top plan view of the end member in FIGS. 2-6.
Figure 8:
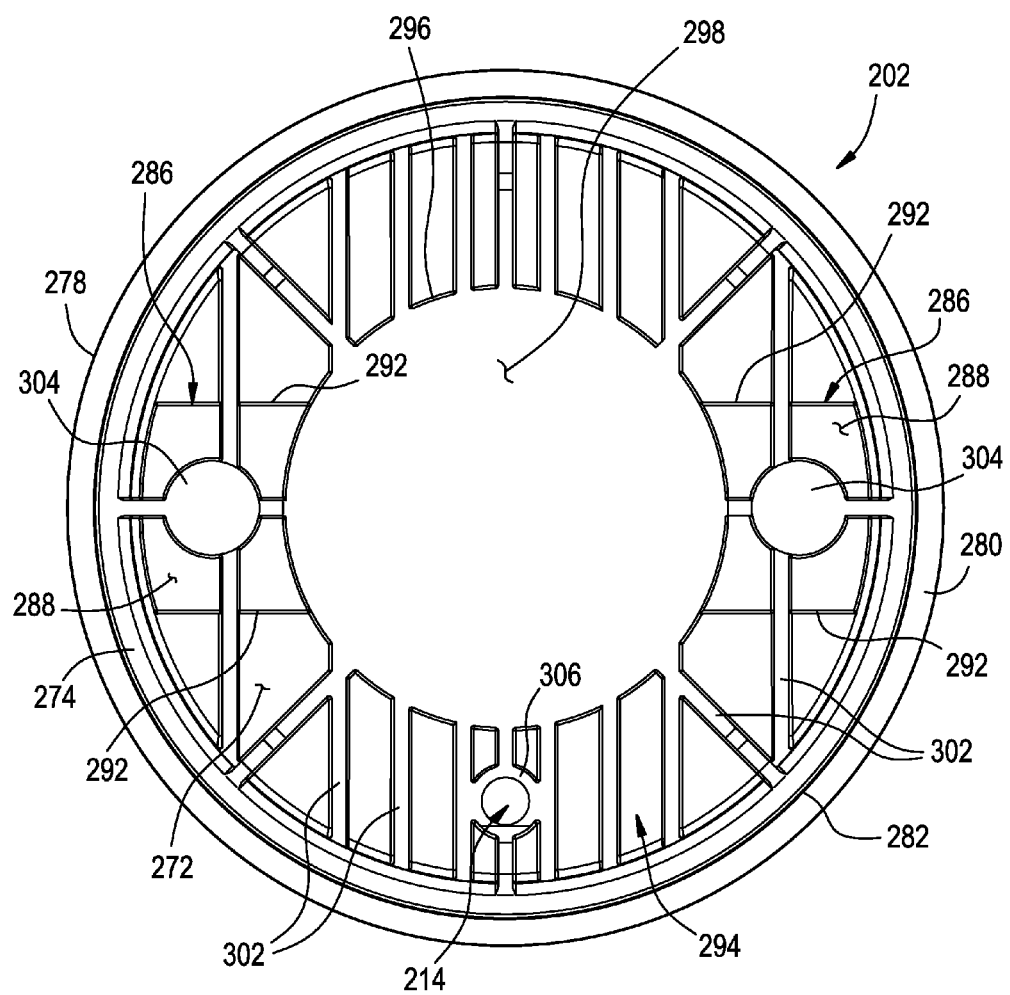
FIG. 8 is a bottom plan view of the end member in FIGS. 2-7.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIGS. 2-4, for example, end member 202 is secured along a first or upper structural component USC, such as associated vehicle body BDY in FIG. 1, for example, and can be secured thereon in any suitable manner. For example, one or more securement devices, such as threaded fasteners 210, for example, can operatively engage a corresponding one or more securement features, such as threaded holes 212 (FIGS. 5 and 7), for example, disposed on or along end member 202. In some cases, the one or more securement features (e.g., threaded holes 212) can extend inwardly into end member 202 and can be dimensioned to receive and threadably engage the one or more securement devices (e.g., threaded fasteners 210) in a suitable manner. Additionally, such one or more securement devices can extend through mounting holes (not shown) in upper structural component USC to engage end member 202. As an alternative, one or more mounting studs (not shown) could project from the end member and extend through the one or more mounting holes of the upper structural component to receive one or more securement devices, such as threaded nuts (not shown), for example.

Additionally, a fluid communication port, such as a transfer passage 214, for example, can optionally be provided to permit fluid communication with spring chamber 208, such as may be used for transferring pressurized gas into and/or out of the spring chamber, for example. In the exemplary embodiment shown, transfer passage 214 extends through a connector fitting 216 and through end member 202 into fluid communication with spring chamber 208. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. In such case, a threaded fastener 218 could be operatively connected to end member 204 and could extend through one of mounting holes HLS to engage a corresponding threaded fitting 220, for example, such as may be embedded or otherwise retained on or along the end member.

It will be appreciated that the one or more end members can be of any suitable type, kind, construction and/or configuration, and can be operatively connected or otherwise secured to the flexible wall in any suitable manner. In the exemplary arrangement shown in FIGS. 2-8, for example, end member 202 is of a type commonly referred to as a top cap or top plate and is secured to a first end 222 of flexible wall 206 using a retaining ring 224 that can be crimped or otherwise radially-inwardly deformed to capture at least a portion of flexible wall 206 between the end member and the retaining ring. End member 204 is shown in the exemplary arrangement in FIGS. 2-4 as being of a type commonly referred to as a piston (or a roll-off piston) that has an outer surface 226 that abuttingly engages flexible wall 206 such that a rolling lobe 228 is formed therealong. As gas spring assembly 200 is displaced between extended and collapsed conditions, rolling lobe 228 is displaced along outer surface 226 in a conventional manner.

As identified in FIGS. 3 and 4, end member 204 includes an end member body 230 and extends from along a first or upper end 232 toward a second or lower end 234 that is spaced longitudinally from end 232. Body 230 includes a longitudinally-extending outer side wall 236 that extends peripherally about axis AX and at least partially defines outer surface 226. An end wall 238 is disposed transverse to axis AX and extends radially-inwardly from along a shoulder portion 240, which is disposed along the outer side wall toward end 232. Body 230 also includes a first inner side wall 242 that extends longitudinally-outwardly beyond end wall 238 and peripherally about axis AX. First inner side wall 242 has an outer surface 244 that is dimensioned to receive a second end 246 of flexible wall 206 such that a substantially fluid-tight seal can be formed therebetween. A retaining ridge 248 can project radially-outwardly from along first inner side wall 242 and can extend peripherally along at least a portion thereof.

Body 230 also includes a second inner side wall 250 that extends longitudinally-inwardly into the body from along end wall 238. Second inner side wall 250 terminates at a bottom wall 252 that is approximately planar and disposed transverse to axis AX such that second inner side wall 250 and bottom wall 252 at least partially define a cavity 254 within body 230. In some cases, bridge walls 256 can, optionally, extend between and operatively interconnect outer side wall 236 and second inner side wall 250.

An inner support wall 258 is disposed radially-inward from outer side wall 236 and extends peripherally about axis AX. In some cases, inner support wall 258 can form a hollow column-like structure that projects from along bottom wall 252 in a longitudinal direction toward end 234. In some cases, the distal end of outer side wall 236 and/or the distal end of inner support wall 258 can at least partially define a mounting plane MP formed along end 234 of the end member body. In this manner, body 230 can be supported at least in part by outer side wall 236 and/or inner support wall 258, such as on or along an associated structural member (e.g., lower structural component LSC in FIGS. 2-4). In some cases, axially applied loads or forces transmitted to bottom wall 252, such as from impacts imparted on a jounce bumper, for example, can be reacted, communicated or otherwise at least partially transferred to the associated mounting structure by the inner support wall.

Body 230 can also include a central wall 260 that is disposed radially-inwardly from inner support wall 258 and forms a post-like structure that projects from along bottom wall 252 in a direction toward end 234. In some cases, central wall 260 can terminate in approximate alignment with mounting plane MP, such as is illustrated in FIGS. 3 and 4, for example. End member 204 can optionally include one or more features or components suitable for use in securing the end member on or along an associated structural component. As one example, threaded fitting 220 can take the form of a threaded insert that can be molded into or otherwise captured and retained within central wall 260 and can be dimensioned to receive a suitable threaded fastener (e.g., threaded fastener 218) for securement of the end member on or along the associate structural component (e.g., lower structural component LSC). In some cases, a longitudinally-extending passage 262 can extend into central wall 260 from along mounting plane MP such that the threaded fastener can reach and engage threaded fitting 220 or another suitable feature.

In some cases, body 230 of end member 204 can include a bumper mount 264 that is disposed along bottom wall 252 and projects outwardly therefrom in an axial direction toward end 232 of the end member body. If included, bumper mount 264 can be dimensioned to receive and retain a jounce bumper 266, which can also optionally be provided. Jounce bumper 266 can be of any suitable construction and can include a distal end 268 having an end surface 270 configured to abuttingly engage end member 202 or another component during a jounce or compressed condition, such as is shown in FIG. 4, for example. It will be appreciated that the jounce bumper and bumper mount are merely exemplary and that any other suitable configuration and/or arrangement could alternately be used.

With reference, now, to FIGS. 2-8, end member 202 can include an end wall 272 and an outer side wall 274 that extends from along end wall 272 toward a distal edge 276. End wall 272 includes an outer peripheral edge 278 and outer side wall 274 can be spaced inwardly from outer peripheral edge 278 such that a shoulder surface 280 is at least partially defined between end wall 272 and outer side wall 274 and can extend peripherally about end member 202. Outer side wall 274 can, optionally, include one or more features disposed along an outer surface 282 thereof that may be suitable for engaging a surface of flexible wall 206 to thereby enhance retention of the flexible wall and end member in an assembled condition. As one example, the one or more features disposed on or along the outer surface of outer side wall 274 can include a plurality of axially-spaced, endless, annular grooves 284 that extend inwardly into the outer side wall. It will be appreciated, however, that other configurations and/or arrangements could alternately be used.

It will be appreciated that end wall 272 of end member 202 can be of any suitable size, shape and/or configuration. For example, in some cases, the end wall could be substantially planar or could include one or more substantially planar wall portions. In other cases, the end wall can include one or more non-planar wall portions, such as one or more wall portions having a curved or angularly disposed cross-sectional shape. In such cases, end wall 272 could include a frustoconical or contoured shape, such as is shown in FIGS. 2-8, for example.

In cases in which end wall 272 or one or more portions thereof is/are not at least approximately planar, such as is shown in FIGS. 2-8, for example, end member 202 can include a mounting ridge 286 that extends at least partially along the end member and at least partially forms a mounting surface for abuttingly engaging an associated structural component (e.g., upper structural component USC). It will be appreciated that mounting ridge 286 can be formed or otherwise defined in any suitable manner. As one example, a ridge wall 288 can extend across end member 202 between opposing edge walls 290. Ridge wall 288 is shown as having a substantially planar outer surface (not numbered), and is shown in FIGS. 2-4 as being disposed in abutting engagement with upper structural component USC. In some cases, edge walls 290 can be disposed in approximate alignment with a portion of outer peripheral edge 278 such that mounting ridge 286 extends substantially entirely across end member 202. Additionally, in some cases, ridge side walls 292 can extend between and operatively interconnect end wall 272 and one or more portions of ridge wall 282. It will be appreciated, however, that other configurations and/or arrangements could alternately be used.

End wall 272 and outer side wall 274 can at least partially define an inner cavity 294 of end member 202. An inner side wall 296 can extend into inner cavity 294 from along one or more of end wall 272, ridge wall 288 and/or ridge side walls 292. Additionally, a base wall 298 can extend at least partially across inner side wall 296 to at least partially define an outer cavity 300. It will be appreciated that inner cavity 294 is shown as being disposed in fluid communication with spring chamber 208, and that outer cavity 300 is shown as being disposed outwardly of the spring chamber and accessible from along the exterior of the gas spring assembly. Furthermore, it will be appreciated that inner side wall 296 can be of any suitable size, shape and/or configuration. In the exemplary arrangement in FIGS. 2-8, inner side wall 296 is shown as having an approximately cylindrical shape, and base wall 298 is shown as being approximately planar. It will be appreciated, however, that any other suitable configuration could alternately be used.

Base wall 298 is shown as extending across inner side wall 296 and forms a closed end of outer cavity 300. Additionally, in a preferred embodiment, base wall 298 is configured to abuttingly engage jounce bumper 266 such that loads and/or forces associated with compressed conditions of the gas spring assembly can be transferred to, from and/or between end members 202 and 204 by way of base wall 298 and jounce bumper 266, such as is illustrated in FIG. 4, for example. In some cases, end member 202 can include one or more connector walls 302 that can extend between and/or otherwise operatively interconnect two or more of end wall 272, outer side wall 274, ridge walls 288, edge walls 290, ridge side walls 292 and/or inner side wall 296. Such one or more of connector walls 302, if included, can separate or otherwise at least partially divide inner cavity 294 into a plurality of chambers (not numbered). In some cases, bosses 304 can be formed within inner cavity 294, such as between end wall 272 and one or more of connector walls 302, and can at least partially form threaded holes 212. Additionally, one or more passage walls 306 can be formed within inner cavity 294, such as between end wall 272 and one or more of connector walls 302, for example, and can at least partially form transfer passage 214.

Additionally, or in the alternative, end member 202 can include one or more connector walls 308 that can extend between and/or otherwise operatively interconnect inner side wall 296 and base wall 298. Such one or more of connector walls 308, if included, can separate or otherwise at least partially divide outer cavity 302 a plurality of chambers (not numbered). In some cases, one or more of connector walls 308 can extend axially from along base wall 298 into approximate alignment with ridge walls 288. Additionally, it will be appreciated that connector walls 302 and 308 can be of any suitable arrangement and/or configuration. As shown in FIGS. 3, 4, 5 and 7, for example, some of the connector walls can have an approximately linear configuration and other connector walls can have a curved (e.g., circular) configuration.

Figure 9:
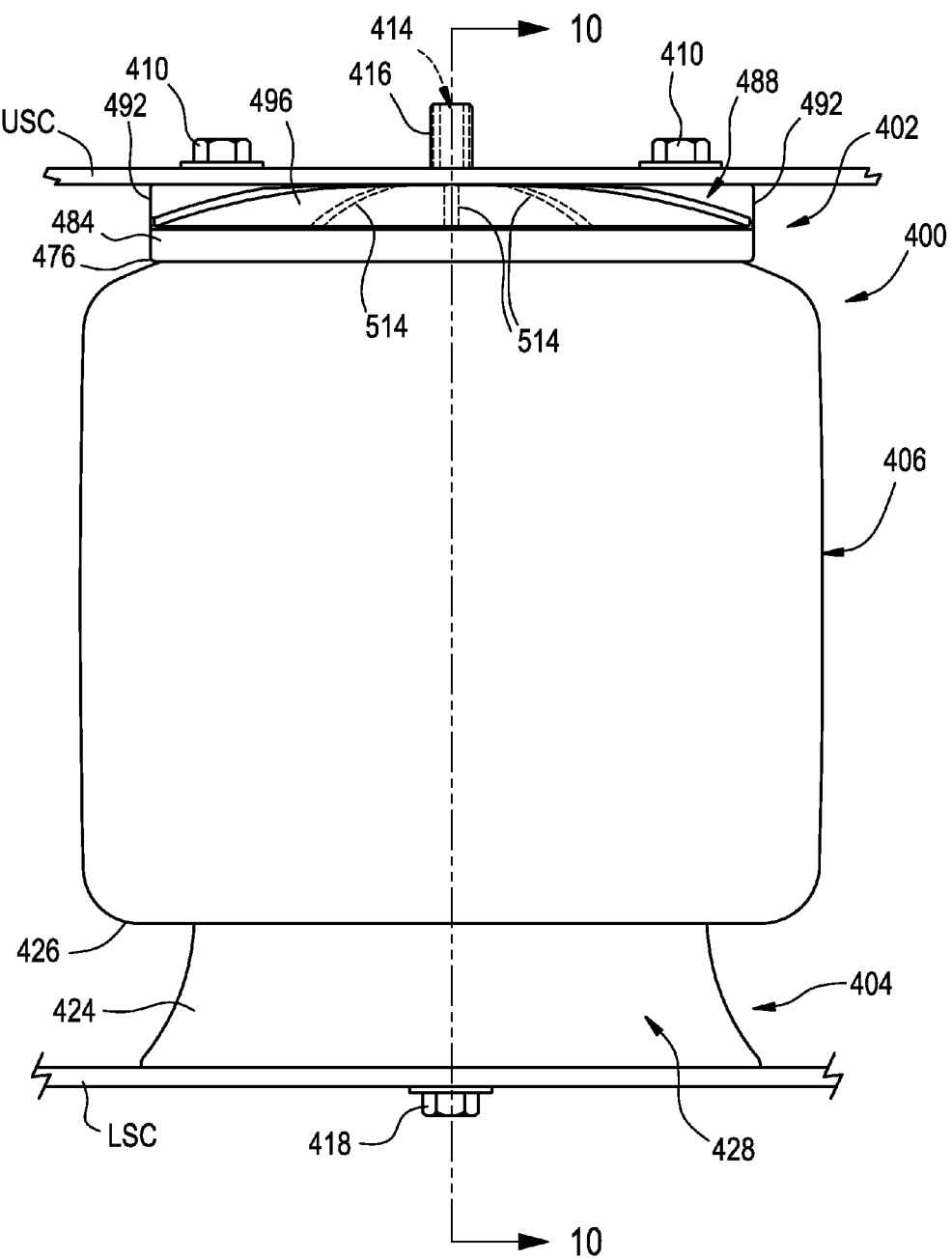
FIG. 9 is a side elevation view of another example of a gas spring assembly that includes another example of an end member in accordance with the subject matter of the present disclosure.
Figure 10:
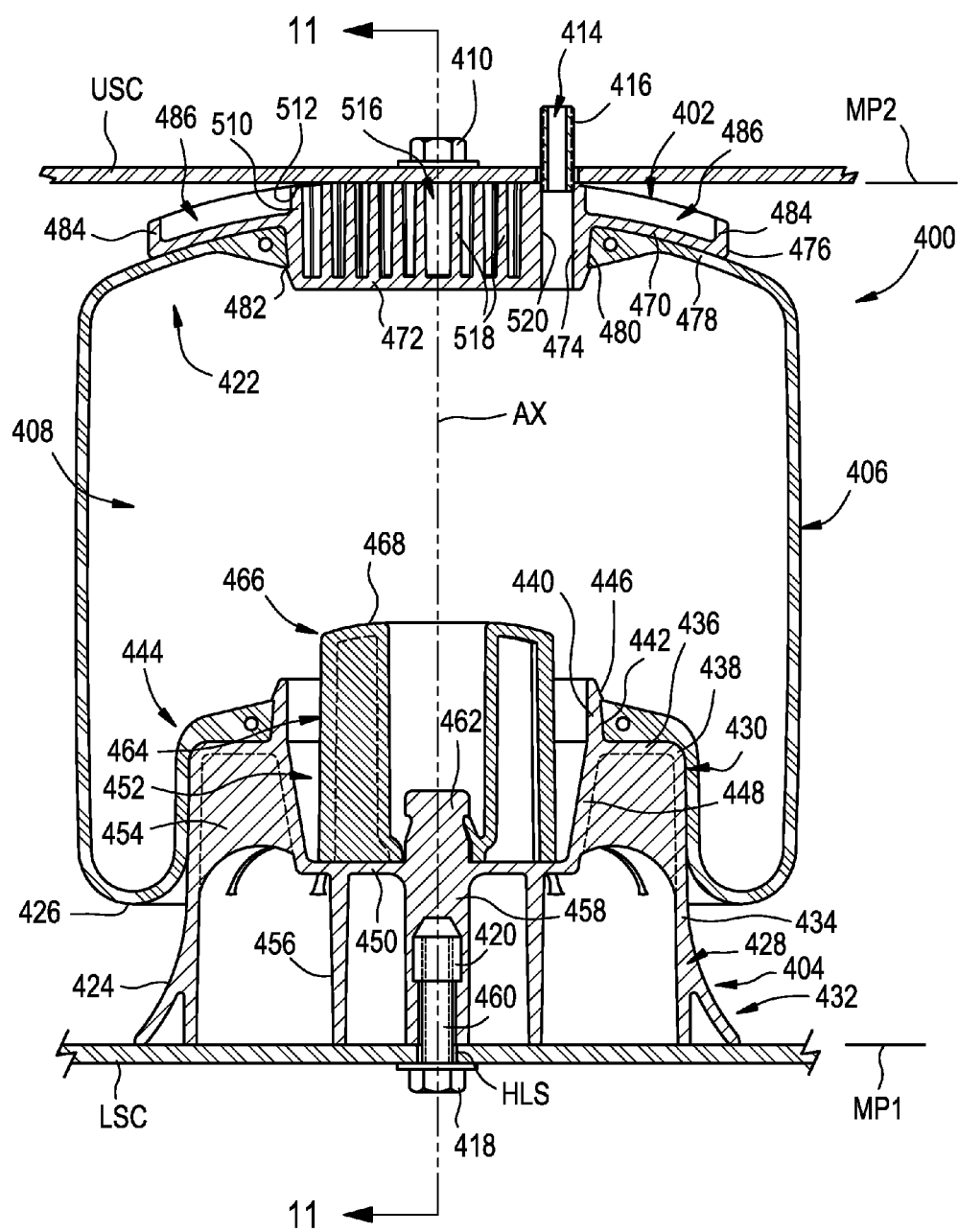
FIG. 10 is a cross-sectional side view of the gas spring assembly in FIG. 9 taken from along line 10-10 in FIG. 9.
Figure 11:
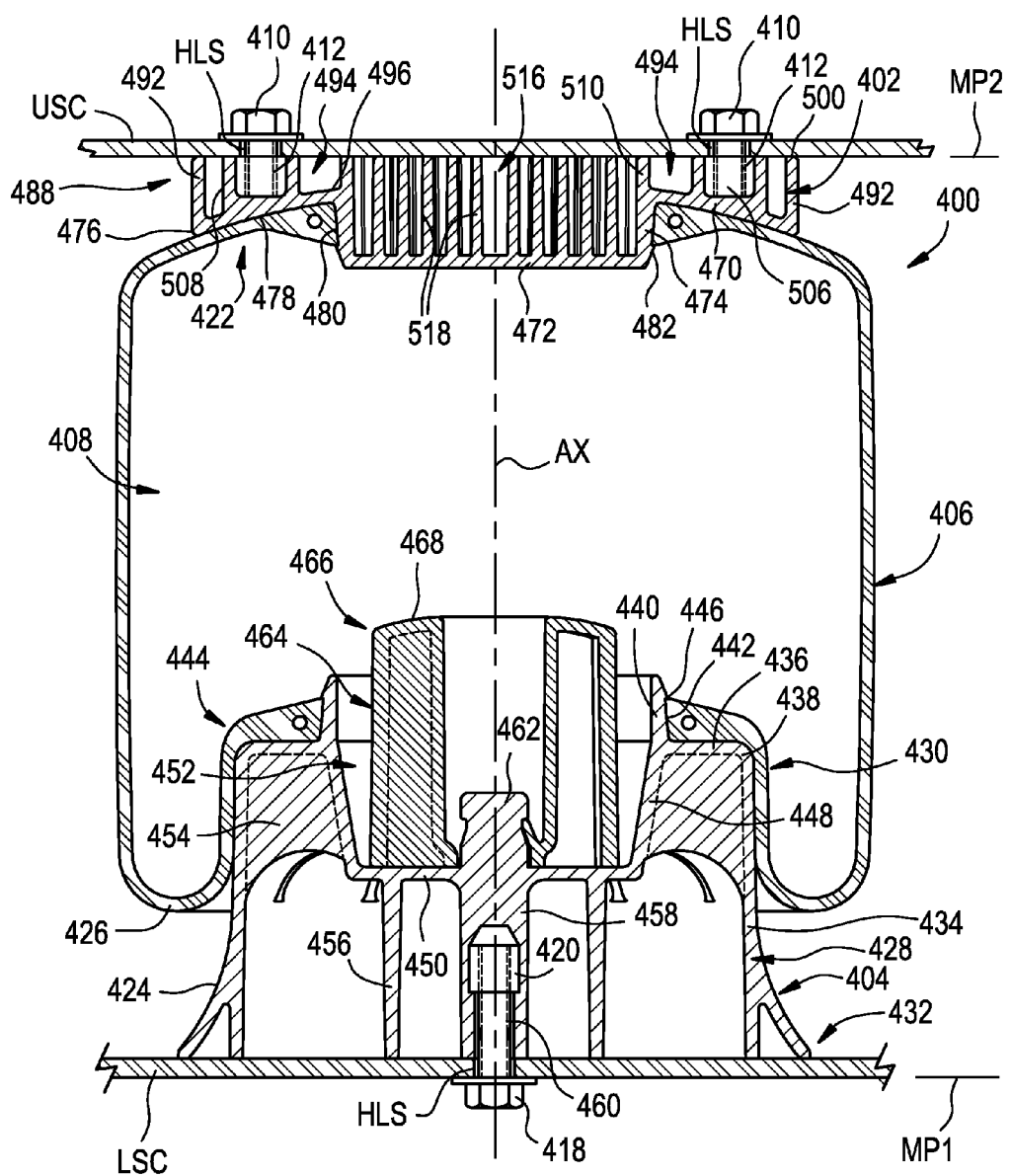
FIG. 11 is a cross-sectional side view of the gas spring assembly in FIGS. 9 and 10 taken from along line 11-11 in FIG. 10.

Another example of a gas spring assembly 400 in accordance with the subject matter of the present disclosure is shown in FIGS. 9-11 as having a longitudinally-extending axis AX and can include one or more end members, such as an end member 402 and an end member 404 that is spaced longitudinally from end member 402. A flexible wall 406 can extend peripherally around axis AX and can be secured between the end members in a substantially fluid-tight manner such that a spring chamber 408 is at least partially defined therebetween.

Gas spring assembly 400 can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIGS. 9-11, for example, end member 402 is secured along first or upper structural component USC and can be secured thereon in any suitable manner. For example, one or more securement devices, such as threaded fasteners 410, for example, can operatively engage a corresponding one or more securement features, such as threaded holes 412 (FIGS. 11 and 12), for example, disposed on or along end member 402. In some cases, the one or more securement features (e.g., threaded holes 412) can extend inwardly into end member 402 and can be dimensioned to receive and threadably engage the one or more securement devices (e.g., threaded fasteners 410) in a suitable manner. Additionally, such one or more securement devices can extend through mounting holes HLS in upper structural component USC to engage end member 402. As an alternative, one or more mounting studs (not shown) could project from the end member and extend through the one or more mounting holes of the upper structural component to receive one or more securement devices, such as threaded nuts (not shown), for example.

Additionally, a fluid communication port, such as a transfer passage 414, for example, can optionally be provided to permit fluid communication with spring chamber 408, such as may be used for transferring pressurized gas into and/or out of the spring chamber, for example. In the exemplary embodiment shown, transfer passage 414 extends through a connector fitting 416 and through end member 402 into fluid communication with spring chamber 408. It will be appreciated, however, that any other suitable fluid communication arrangement could alternately be used.

End member 404 can be secured along second or lower structural component LSC in any suitable manner. As one example, lower structural component LSC could include one or more mounting holes HLS extending therethrough. In such case, a threaded fastener 418 could be operatively connected to end member 404 and could extend through one of mounting holes HLS to engage a corresponding threaded fitting 420, for example, such as may be embedded or otherwise retained on or along the end member.

It will be appreciated that the one or more end members can be of any suitable type, kind, construction and/or configuration, and can be operatively connected or otherwise secured to the flexible wall in any suitable manner. In the exemplary arrangement shown in FIGS. 9-11, for example, end member 402 is of a type commonly referred to as a top cap and is secured to a first end 422 of flexible wall 406. End member 404 is shown in the exemplary arrangement in FIGS. 9-11 as being of a type commonly referred to as a piston (or a roll-off piston) that has an outer surface 424 that abuttingly engages flexible wall 406 such that a rolling lobe 426 is formed therealong. As gas spring assembly 400 is displaced between extended and collapsed conditions, rolling lobe 426 is displaced along outer surface 424 in a conventional manner.

As identified in FIGS. 10 and 11, end member 404 includes an end member body 428 and extends from along a first or upper end 430 toward a second or lower end 432 that is spaced longitudinally from end 430. Body 428 includes a longitudinally-extending outer side wall 434 that extends peripherally about axis AX and at least partially defines outer surface 424. An end wall 436 is disposed transverse to axis AX and extends radially-inward from along a shoulder portion 438, which is disposed along the outer side wall toward end 430. Body 428 also includes a first inner side wall 440 that extends longitudinally-outward beyond end wall 436 and peripherally about axis AX. First inner side wall 440 has an outer surface 442 that is dimensioned to receive a second end 444 of flexible wall 406 such that a substantially fluid-tight seal can be formed therebetween. A retaining ridge 446 can project radially-outward from along first inner side wall 440 and can extend peripherally along at least a portion thereof.

Body 428 also includes a second inner side wall 448 that extends longitudinally-inward into the body from along end wall 436. Second inner side wall 448 terminates at a bottom wall 450 that is approximately planar and disposed transverse to axis AX such that second inner side wall 448 and bottom wall 450 at least partially define a cavity 452 within body 428. In some cases, bridge walls 454 can, optionally, extend between and operatively interconnect outer side wall 434 and second inner side wall 448.

An inner support wall 456 is disposed radially-inward from outer side wall 434 and extends peripherally about axis AX. In some cases, inner support wall 456 can form a hollow column-like structure that projects from along bottom wall 450 in a longitudinal direction toward end 432. In some cases, the distal end of outer side wall 434 and/or the distal end of inner support wall 456 can at least partially define a mounting plane MP1 formed along end 432 of the end member body. In this manner, body 428 can be supported at least in part by outer side wall 434 and/or inner support wall 456, such as on or along an associated structural member (e.g., lower structural component LSC). In some cases, axially applied loads or forces transmitted to bottom wall 450, such as from impacts imparted on a jounce bumper, for example, can be reacted, communicated or otherwise at least partially transferred to the associated mounting structure by the inner support wall.

Body 428 can also include a central wall 458 that is disposed radially-inwardly from inner support wall 456 and forms a post-like structure that projects from along bottom wall 450 in a direction toward end 432. In some cases, central wall 458 can terminate in approximate alignment with mounting plane MP1, such as is illustrated in FIGS. 10 and 11, for example. End member 404 can optionally include one or more features or components suitable for use in securing the end member on or along an associated structural component. As one example, threaded fitting 420 can take the form of a threaded insert that can be molded into or otherwise captured and retained within central wall 458 and can be dimensioned to receive a suitable threaded fastener (e.g., threaded fastener 418) for securement of the end member on or along the associated structural component (e.g., lower structural component LSC). In some cases, a longitudinally-extending passage 460 can extend into central wall 458 from along mounting plane MP1 such that the threaded fastener can reach and engage threaded fitting 420 or another suitable feature.

In some cases, body 428 of end member 404 can include a bumper mount 462 that is disposed along bottom wall 450 and projects outwardly therefrom in an axial direction toward end 430 of the end member body. If included, bumper mount 462 can be dimensioned to receive and retain a jounce bumper 464, which can also optionally be provided. Jounce bumper 464 can be of any suitable construction and can include a distal end 466 having an end surface 468 configured to abuttingly engage end member 402 or another component during a jounce or compressed condition, such as is shown in FIG. 4 in connection with jounce bumper 266, for example. It will be appreciated that the jounce bumper and bumper mount are merely exemplary and that any other suitable configuration and/or arrangement could alternately be used.

With reference, now, to FIGS. 9-12, end member 402 can include an end wall 470, a base wall 472 disposed in axially spaced relation to the end wall, and a side wall 474 that extends between end wall 470 and base wall 472. End wall 470 includes an outer peripheral edge 476 and side wall 474 can be spaced inwardly from outer peripheral edge 476 such that a surface 478 is at least partially defined along end wall 470 between the outer peripheral edge and side wall 474, and that is dimensioned to abuttingly engage at least a portion of flexible wall 406. Side wall 474 can extend longitudinally-outward from end wall 436 and peripherally about axis AX in a direction toward end member 404. Side wall 474 can have an outer surface 480 that is dimensioned to receive second end 422 of flexible wall 406 such that a substantially fluid-tight seal can be formed therebetween. In some cases, ends 422 and/or 444 can include a mounting bead (not numbered) formed along an end portion of flexible wall 406. In such cases, the one or more mounting beads can include a reinforcing element, such as a bead wire (not numbered), for example. Additionally, a retaining ridge 482 can, optionally, project radially-outward from along side wall 474 and can extend peripherally along at least a portion thereof.

It will be appreciated that end wall 470 of end member 402 can be of any suitable size, shape and/or configuration. For example, in some cases, the end wall could be substantially planar or could include one or more substantially planar wall portions. In other cases, the end wall can include one or more non-planar wall portions, such as one or more wall portions having a curved or angularly disposed cross-sectional shape. In such cases, end wall 470 could include a frustoconical or contoured shape, such as is shown in FIGS. 9-12, for example. Additionally, end member 402 can include an outer edge wall 484 disposed along or at least adjacent outer peripheral edge 476 of end wall 470. Outer edge wall 484 can, in some cases, project from along end wall 470 in a direction away from base wall 472 and can at least partially form one or more recesses 486 along end wall 470.

In cases in which end wall 470 or one or more portions thereof is/are not at least approximately planar, such as is shown in FIGS. 9-12, for example, end member 402 can include a mounting ridge 488 that extends at least partially along the end member and at least partially forms a mounting surface for abuttingly engaging an associated structural component (e.g., upper structural component USC). It will be appreciated that mounting ridge 488 can be formed or otherwise defined in any suitable manner. As one example, ridge side walls 490 can extend across end member 402 in a direction transverse to axis AX. Additionally, ridge edge walls 492 can be disposed adjacent outer peripheral edge 476 and can extend in a direction transverse to axis AX and between ridge side walls 490 to at least partially define ridge recesses 494 along end wall 470 of end member 402.

Ridge side walls 490 extend from along an outer surface 496 of end wall 470 to a distal end surface 498. Additionally, or in the alternative, ridge edge walls 492 can extend from along outer surface 496 of end wall 470 to a distal end surface 500. In a preferred arrangement, distal end surfaces 498 and/or 500 can at least partially define a mounting plane MP2 along end member 402 that is dimensioned to abuttingly engage an associated structural member (e.g., upper structural component USC). In some cases, one or more ridge inner walls 502 can be disposed between ridge side walls 490 and can extend from along outer surface 496 of end wall 470 in a direction toward mounting plane MP2. In some case, ridge inner walls 502 can include a distal end surface 504 that is disposed in approximate alignment with mounting plane MP2. In other cases, however, the distal end surface of the ridge inner walls can be disposed in spaced relation to the mounting plane, such as in an axial direction toward end wall 470, for example.

End member 402 can, optionally, include one or more features or components suitable for use in securing the end member on or along an associated structural component. As one example, threaded holes 412 can be at least partially defined by one or more threaded fittings 506 that can take the form of threaded inserts that can be molded into or otherwise captured and retained within a boss 508 or other wall portion of end wall 470 and/or one or more of ridge inner walls 502. Threaded fittings 506 can be dimensioned to receive a suitable threaded fastener (e.g., threaded fasteners 410) for securement of the end member on or along the associate structural component (e.g., upper structural component USC).

End member 402 can, optionally, include inner edge walls 510 that extends from along end wall 470 and extend at least partially around axis AX. Inner edge walls 510, if included, can project from along outer surface 496 in a direction toward mounting plane MP2. In some cases, inner edge walls 510 can terminate at distal end surfaces 512, which can, in some cases, be disposed in approximate alignment with mounting plane MP2. Additionally, end member 402 can, optionally, include one or more connector walls 514 that project from along outer surface 496 of end wall 470 in a direction toward mounting plane MP2. It will be appreciated that the one or more connector walls can be of any suitable size, shape and/or configuration. As one example, a plurality of connector walls 514 are shown as extending in a generally radial orientation between inner edge walls 510 and outer edge wall 484. However, other configurations and/or arrangements could alternately be used.

As illustrated in FIGS. 10 and 11, base wall 472 extends transverse to axis AX and generally across side wall 474 such that an outer cavity 516 is at least partially formed thereby along the exterior of end member 402. In a preferred embodiment, base wall 472 is dimensioned or otherwise configured to abuttingly engage jounce bumper 464 such that loads and/or forces associated with compressed conditions of the gas spring assembly can be transferred to, from and/or between end members 402 and 404 by way of base wall 472 and jounce bumper 464, such as is illustrated in FIG. 4 in connection with jounce bumper 266, for example.

Figure 12:
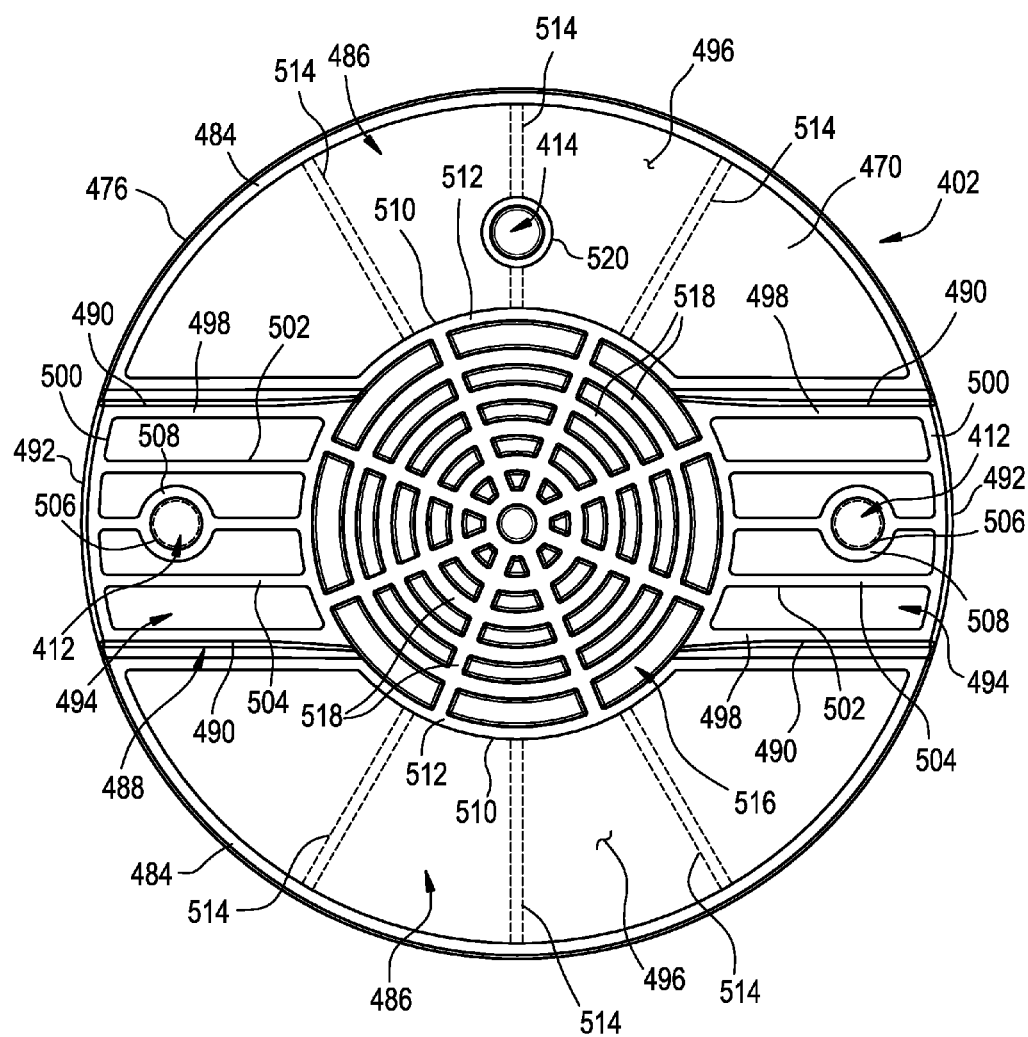
FIG. 12 is a top plan view of the end member in FIGS. 9-11.

End member 402 can include one or more connector walls 518 that can extend between and/or otherwise operatively interconnect base wall 472, side wall 474 and/or inner edge walls 510. Such one or more connector walls 518, if included, can separate or otherwise at least partially divide outer cavity 516 into a plurality of chambers (not numbered). In some cases, one or more of connector walls 518 can extend axially from along base wall 472 into approximate alignment with the distal edge surfaces of ridge side walls 490 and/or ridge edge walls 492, such as in approximate alignment with mounting plane MP2, for example. Additionally, it will be appreciated that connector walls 518 can be of any suitable arrangement and/or configuration. As shown in FIGS. 10-12, for example, some of the connector walls can have a curved (e.g., circular) configuration. Furthermore, end member 402 can include one or more passage walls 520 that can at least partially form transfer passage 414.

Figure 13:
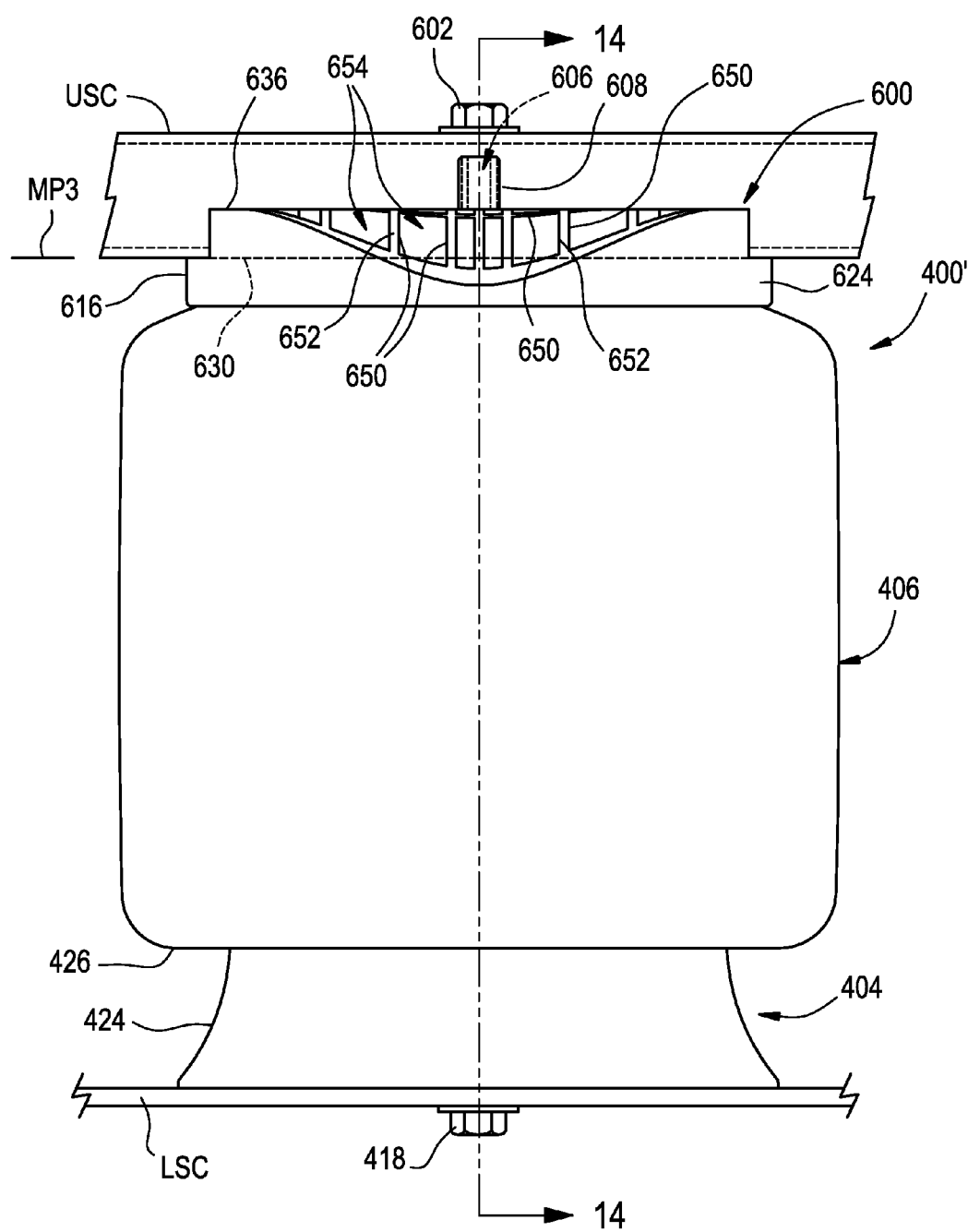
FIG. 13 is a side elevation view of a further example of a gas spring assembly that includes a further example of an end member in accordance with the subject matter of the present disclosure.
Figure 14:
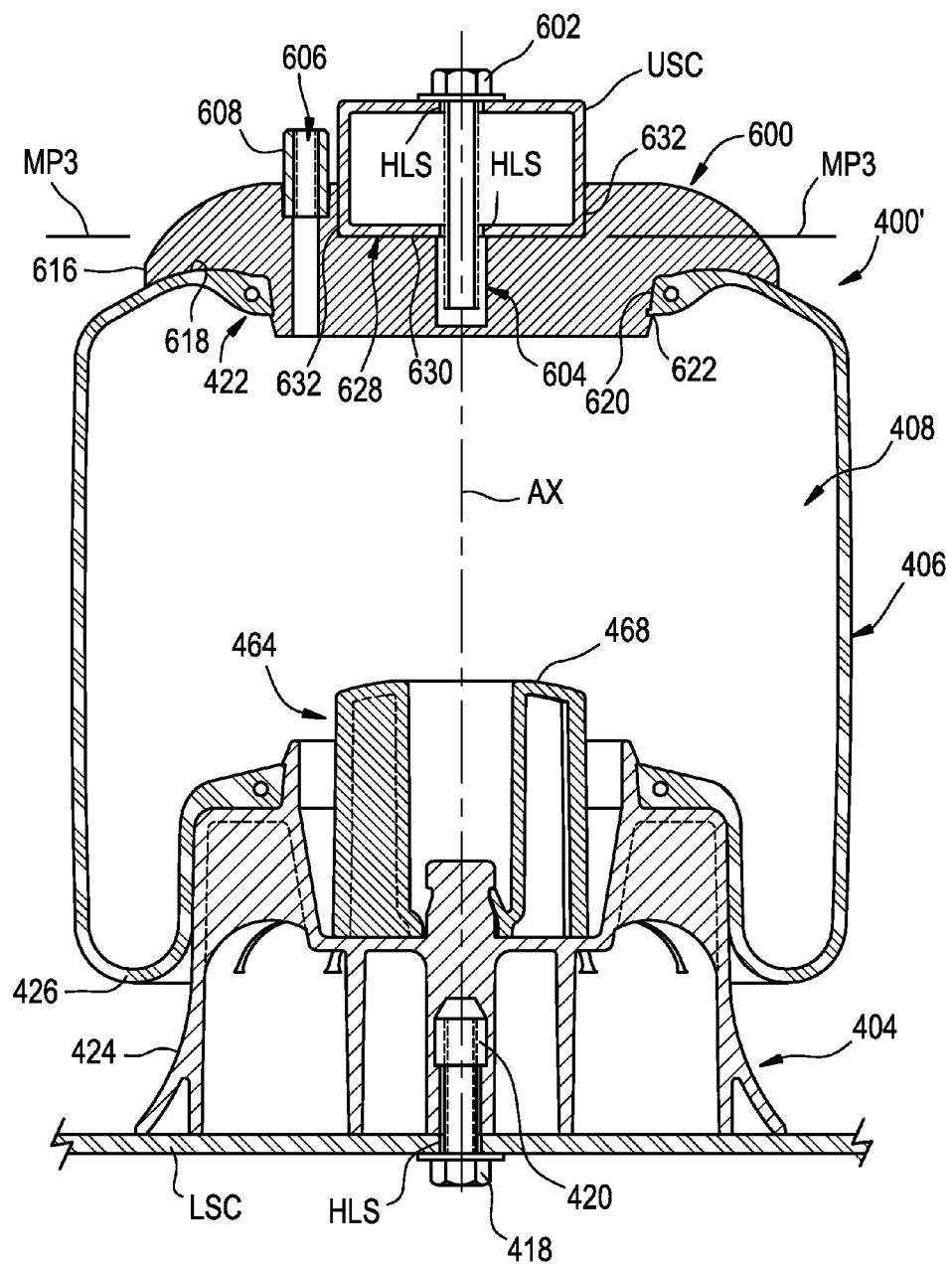
FIG. 14 is a cross-sectional side view of the gas spring assembly in FIG. 13 taken from along line 14-14 in FIG. 13.
Figure 15:
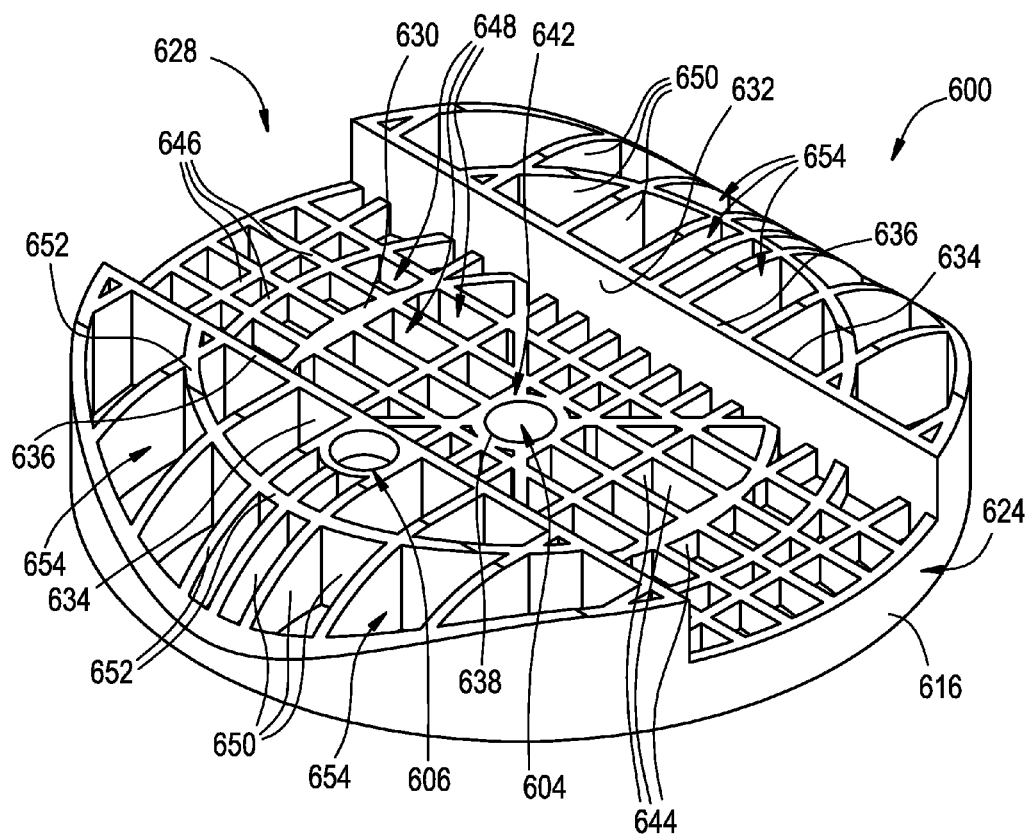
FIG. 15 is a top perspective view of the end member in accordance with the subject matter of the present disclosure shown in FIGS. 13 and 14.
Figure 16:
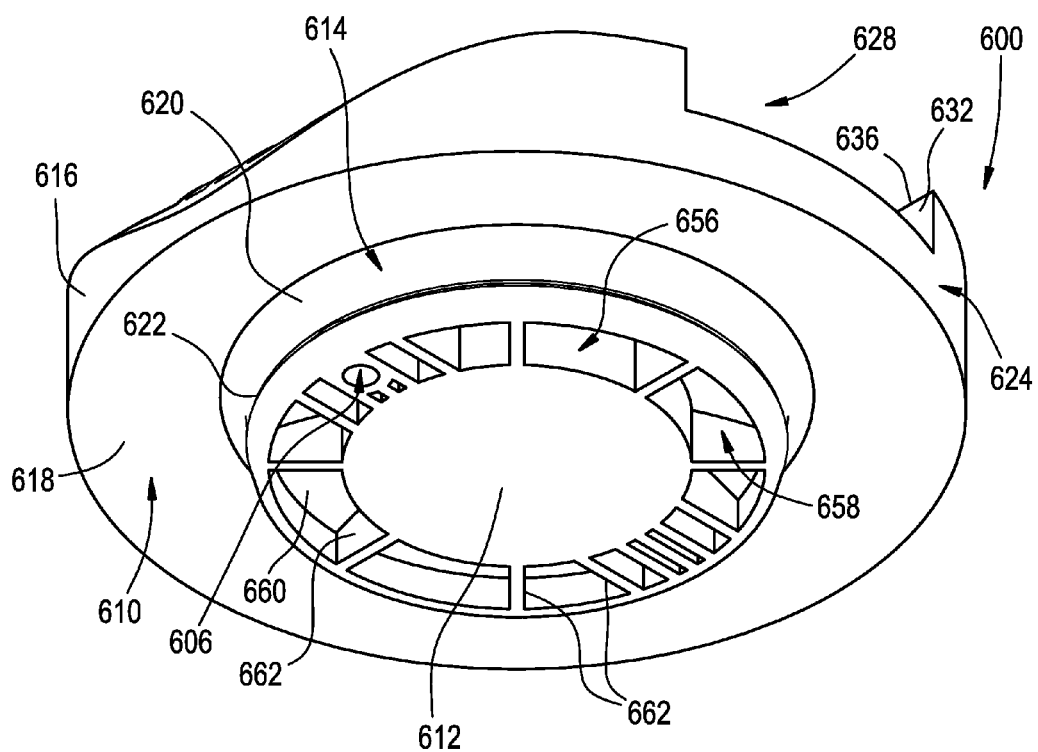
FIG. 16 is a bottom perspective view of the end member in FIGS. 13-15.
Figure 17:
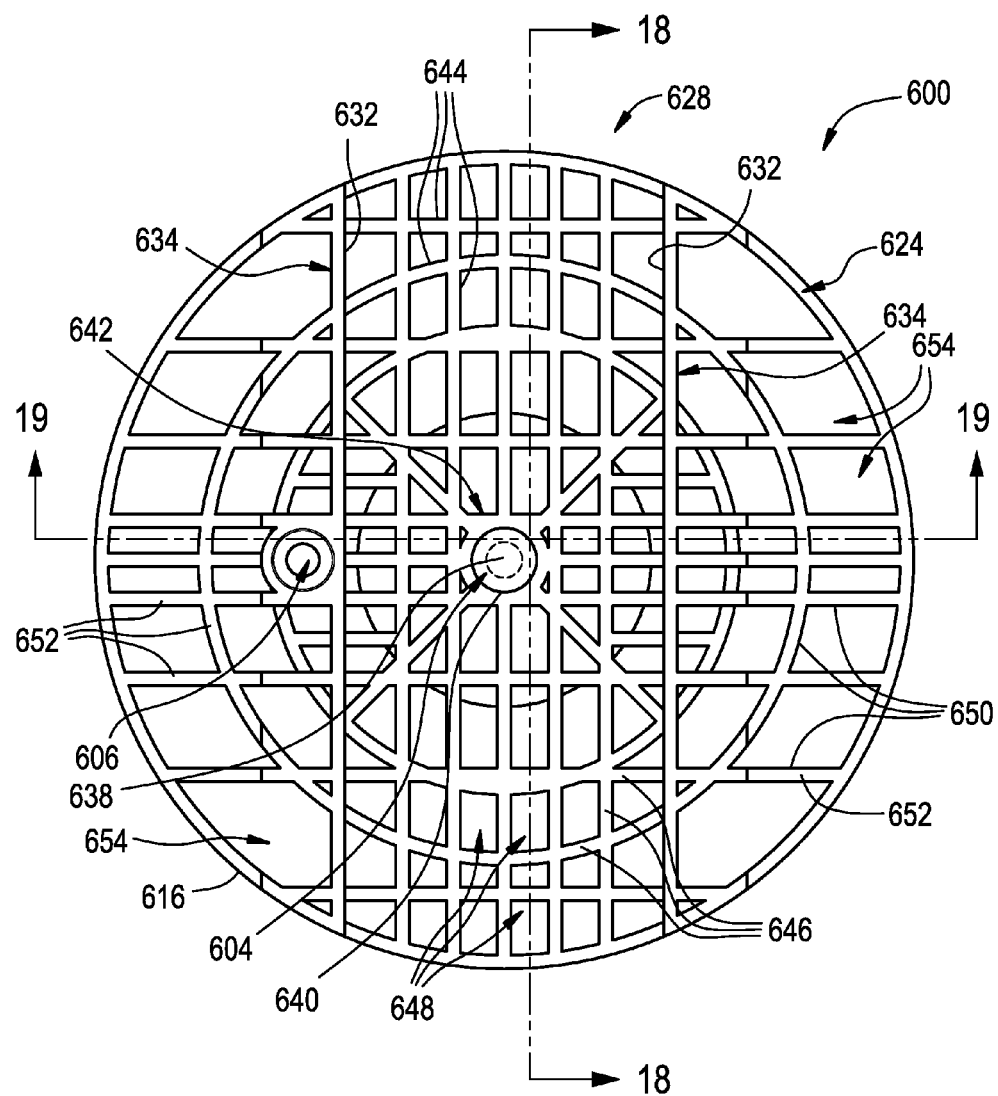
FIG. 17 is a top plan view of the end member in FIGS. 13-16.
Figure 18:
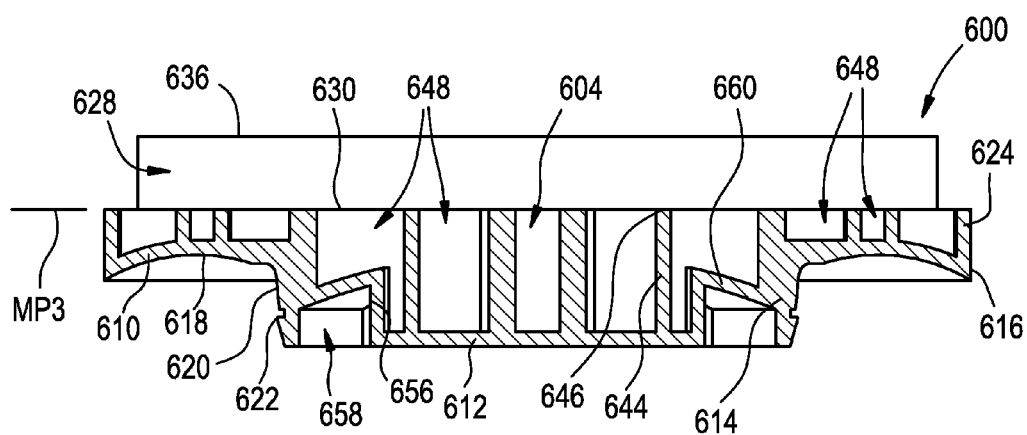
FIG. 18 is a cross-sectional side view of the end member in FIGS. 13-17 taken from along line 18-18 in FIG. 17.
Figure 19:
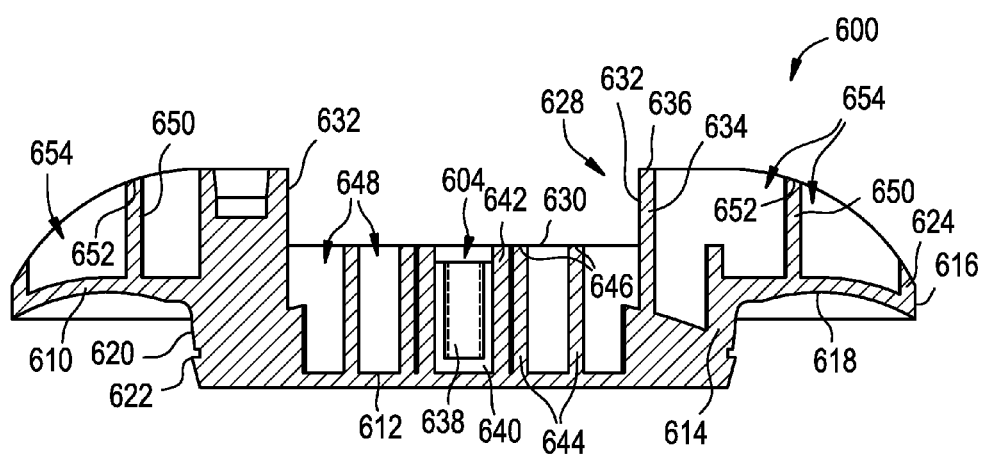
FIG. 19 is a cross-sectional side view of the end member in FIGS. 13-18 taken from along line 19-19 in FIG. 17.

A further example of a gas spring assembly 400' in accordance with the subject matter of the present disclosure is shown in FIGS. 13 and 14. It will be appreciated that gas spring assembly 400' is similar to gas spring assembly 400 shown and described above in connection with FIGS. 9-11. As such, like items will be identified and referred to by like item numbers, and new or different items will be identified by new or primed (') item numbers.

Gas spring assembly 400' is shown as having a longitudinally-extending axis AX and can include one or more end members, such as an end member 600 and an end member 404 that is spaced longitudinally from end member 600. A flexible wall 406 can extend peripherally around axis AX and can be secured between the end members in a substantially fluid-tight manner such that a spring chamber 408 is at least partially defined therebetween.

Gas spring assembly 400' can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIGS. 13 and 14, for example, end member 600 is secured along first or upper structural component USC and can be secured thereon in any suitable manner. For example, one or more securement devices, such as threaded fasteners 602, for example, can operatively engage a corresponding one or more securement features, such as threaded holes 604 (FIG. 14), for example, disposed on or along end member 600. In some cases, the one or more securement features (e.g., threaded holes 604) can extend inwardly into end member 600 and can be dimensioned to receive and threadably engage the one or more securement devices (e.g., threaded fasteners 602) in a suitable manner. Additionally, such one or more securement devices can extend through mounting holes HLS in upper structural component USC to engage end member 600. As an alternative, one or more mounting studs (not shown) could project from the end member and extend through the one or more mounting holes of the upper structural component to receive one or more securement devices, such as threaded nuts (not shown), for example.

Additionally, a fluid communication port, such as a transfer passage 606, for example, can optionally be provided to permit fluid communication with spring chamber 408, such as may be used for transferring pressurized gas into and/or out of the spring chamber, for example. In the exemplary embodiment shown, transfer passage 606 extends through a connector fitting 608 and through end member 600 into fluid communication with spring chamber 408. It will be appreciated, however, that any other suitable fluid communication arrangement could alternately be used.

As described above, end member 404 can be secured along second or lower structural component LSC in any suitable manner. As one example, lower structural component LSC could include one or more mounting holes HLS extending therethrough. In such case, a threaded fastener 418 could be operatively connected to end member 404 and could extend through one of mounting holes HLS to engage a corresponding threaded fitting 420, for example, such as may be embedded or otherwise retained on or along the end member. Additionally, end member 404 is shown in the exemplary arrangement in FIGS. 13 and 14 as being of a type commonly referred to as a piston (or a roll-off piston) that has an outer surface 424 that abuttingly engages flexible wall 406 such that a rolling lobe 426 is formed therealong. As gas spring assembly 400 is displaced between extended and collapsed conditions, rolling lobe 426 is displaced along outer surface 424 in a conventional manner.

In the exemplary arrangement shown in FIGS. 13 and 14, for example, end member 600 is of a type commonly referred to as a top cap and is secured to a first end 422 of flexible wall 406. With reference, now, to FIGS. 13-19, end member 600 can include an end wall 610, a base wall 612 disposed in axially spaced relation to the end wall, and a side wall 614 that extends between end wall 610 and base wall 612. End wall 610 includes an outer peripheral edge 616. Side wall 614 can be spaced inwardly from outer peripheral edge 616 such that a surface 618 is at least partially defined along end wall 610 between the outer peripheral edge and side wall 614. Surface 618 can be dimensioned to abuttingly engage at least a portion of flexible wall 406. Side wall 614 can extend longitudinally-outwardly from end wall 616 and peripherally about axis AX in a direction toward end member 404. Side wall 614 can have an outer surface 620 that is dimensioned to receive second end 422 of flexible wall 406 such that a substantially fluid-tight seal can be formed therebetween. In some cases, a retaining ridge 622 can, optionally, project radially-outwardly from along side wall 614 and can extend peripherally along at least a portion thereof.

It will be appreciated that end wall 610 of end member 600 can be of any suitable size, shape and/or configuration. For example, in some cases, the end wall could be substantially planar or could include one or more substantially planar wall portions. In other cases, the end wall can include one or more non-planar wall portions, such as one or more wall portions having a curved or angularly disposed cross-sectional shape. In such cases, end wall 610 could include a frustoconical or contoured shape, such as is shown in FIGS. 13-19, for example. Additionally, end member 600 can include an outer edge wall 624 disposed along or at least adjacent outer peripheral edge 616 of end wall 610. Outer edge wall 624 can, in some cases, project from along end wall 610 in a direction away from base wall 612 and can at least partially form one or more recesses along end wall 610.

In some cases, end member 600 can, optionally, include a mounting channel 628 that extends at least partially along the end member and is dimensioned to receive and abuttingly engage at least a portion of an associated structural component (e.g., upper structural component USC). In some cases, an associated structural component can be at least partially received within the mounting channel. In a preferred arrangement, the mounting channel can be dimensioned and/or otherwise configured to orient or otherwise position the end member and gas spring assembly relative to the associated structural component. Additionally, such a configuration can assist in maintaining the end member and gas spring assembly in the desired orientation by providing anti-rotation characteristics in addition to added strength and support.

It will be appreciated that such a mounting channel can be of any suitable size, shape, configuration and/or construction for providing the foregoing and/or other features. Additionally, the mounting channel can be formed or otherwise at least partially defined by any suitable combination of walls, wall portions and/or surfaces. For example, end member 600 can include a channel bottom surface 630 that extends in a lengthwise direction transverse to axis AX across the end member and in a lateral direction between opposing channel side surfaces 632.

In a preferred arrangement, at least channel bottom surface 630 of mounting channel 628 can be substantially planar and can at least partially define a mounting plane MP3 along end member 600 that is dimensioned to abuttingly engage an associated structural member (e.g., upper structural component USC). Additionally, in such a preferred arrangement, channel side surfaces can be disposed transverse to channel bottom surface 630 and can also be substantially planar such that mounting channel 628 can have a uniform cross-sectional size and shape along the length thereof. Channel side walls 634 can project outwardly beyond channel bottom surface 630 in a direction opposite base wall 612 to a distal or top edge 636. In such case, channel side walls 634 can include and/or otherwise at least partially define channel side surfaces 632.

End member 600 can, optionally, include one or more features or components suitable for use in securing the end member on or along an associated structural component. As one example, one or more threaded holes 638 (only one of which is shown) can be at least partially defined by one or more threaded fittings 640 (only one of which is shown) that can take the form of threaded inserts that can be molded into or otherwise captured and retained within a boss 642 or other wall portion of end member 600. Threaded fittings 640 can be dimensioned to receive a suitable threaded fastener (e.g., threaded fasteners 602) for securement of the end member on or along the associate structural component (e.g., upper structural component USC).

As indicated above, it will be appreciated that channel bottom surface 630 of mounting channel 628 can be formed or otherwise defined in any suitable manner and by way of any combination of walls, wall portions and/or surfaces. For example, end member 600 can include a plurality of inner support walls 644 that extends from along base wall 612 and terminate at distal ends 646 that collectively at least partially define channel bottom surface 630. Additionally, it will be appreciated that inner support walls 644 can extend along and/or across the end member in any suitable manner, such as by having one or more approximately linear wall sections, one or more curved wall sections and/or any combination of linear and curved wall sections. Furthermore, it will be appreciated that inner support walls 644 can extend or be otherwise disposed in any suitable orientation or combination of orientations, such as by extending in approximate alignment with the lengthwise direction of mounting channel 628, an a lateral orientation relative to the lengthwise direction of the mounting channel, a diagonal orientation to the lengthwise direction of the mounting channel and/or a curvilinear orientation relative to the lengthwise direction of the mounting channel. In some cases, inner support walls 644 can at least partially define a plurality of cavities 648 formed into or otherwise accessible from along channel bottom surface 630. It will be appreciated that such cavities, if included, can be of any suitable size, shape, configuration and/or arrangement.

Additionally, end member 600 can include a plurality of outer support walls 650 that extends from along end wall 610 and terminate at distal ends 652 that collectively at least partially define an outer surface shape of at least a portion of end member 600. It will be appreciated that outer support walls 650 can extend along and/or across the end member in any suitable manner, such as by having one or more approximately linear wall sections, one or more curved wall sections and/or any combination of linear and curved wall sections. Furthermore, it will be appreciated that outer support walls 650 can extend or be otherwise disposed in any suitable orientation or combination of orientations, such as by extending in approximate alignment with the lengthwise direction of mounting channel 628, an a lateral orientation relative to the lengthwise direction of the mounting channel, a diagonal orientation to the lengthwise direction of the mounting channel and/or a curvilinear orientation relative to the lengthwise direction of the mounting channel. In some cases, outer support walls 650 can at least partially define a plurality of cavities 654 that may be accessible from along the outer surface of end member 600. It will be appreciated that such cavities, if included, can be of any suitable size, shape, configuration and/or arrangement.

As illustrated in FIGS. 13-19, base wall 612 extends transverse to axis AX and, in a preferred arrangement, is dimensioned or otherwise configured to abuttingly engage jounce bumper 464 such that loads and/or forces associated with compressed conditions of the gas spring assembly can be transferred to, from and/or between end members 600 and 404 by way of base wall 612 and jounce bumper 464, such as is illustrated in FIG. 4 in connection with jounce bumper 266, for example. It will be appreciated that in the configuration shown, loads and/or forces associated with contact between jounce bumper 464 and base wall 612 can be carried or otherwise transferred to the associated structural component (e.g., upper structural component USC) by way of inner support walls 644.

In some cases, the base wall can extend across the end member and connect directly with the side wall inwardly from the outer surface thereof. In other cases, end member 600 can include an inner side wall 656 that is spaced radially inward from side wall 614 such that a cavity 658 extending into the end member is at least partially formed therebetween. In some cases, a connector wall 660 can extend between and operatively interconnect side wall 614 and inner side wall 656. Alternately, the connector wall can, in some cases, take the form of a radially inward portion of end wall 610. In either of such cases, base wall 612 can extend across the end member and connect directly with inner side wall 656 such that the base wall terminates in radially-spaced relation to side wall 614. In some cases, end member 600 can include one or more connector walls 662 can extend between and/or otherwise operatively interconnect base wall 612, side wall 614, inner side wall 656 and/or connector wall 660 or corresponding portion of end wall 610. Such one or more of connector walls 662, if included, can separate or otherwise at least partially divide outer cavity 658 into a plurality of chambers (not numbered).

It will be appreciated that an end member in accordance with the subject matter of the present disclosure can be formed or otherwise manufactured from any suitable material or combination of materials. In a preferred arrangement, however, end member 202, 204, 402, 404 and/or 600 can be formed from a non-metallic material, such as a thermoplastic or thermoset material, for example. Examples of suitable non-metallic materials from which any one or more of end members 202, 204, 402, 404 and/or 600 can be formed include thermoplastic materials, such as glass or other fiber-reinforced polypropylene, glass or other fiber-reinforced polyamide, as well as high-strength (e.g., unfilled) polyester, polyethylene, polypropylene or other polyether-based materials, or any combination thereof.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed:

1. An end member having an axis and dimensioned to receivingly engage an end of an associated flexible wall of an associated gas spring assembly, said end member comprising:
    an end wall extending radially outward in a direction transverse to said axis toward an outer peripheral edge, said end wall including an end wall surface dimensioned to abuttingly engage the associated flexible wall;
    a side wall extending from said end wall in an axial direction and dimensioned to receivingly engage an end of the associated flexible wall;
    a base wall extending radially outward in a direction transverse to said axis, said base wall disposed in axially offset relation to said end wall such that said base wall can abuttingly engage an associated jounce bumper and such that at least one end cavity is formed along said end wall with said at least one end cavity being accessible from along a side of said end wall opposite said base wall; and,
    a mounting channel extending into and across said end member and at least partially defining a mounting surface for receivingly engaging an associated structural component with at least said end wall, said side wall and said base wall of said end member being integrally formed from a unitary mass of polymeric material.

2. An end member according to claim 1, wherein said mounting channel is dimensioned to receivingly engage an associated structural component and substantially inhibit rotation of said end member relative to the associated structural component.

3. An end member according to claim 1, wherein said mounting channel extends substantially-entirely across said end member.

4. An end member according to claim 1, wherein said mounting channel is at least partially defined by a channel bottom surface extending in a lengthwise direction across said end member, a first side surface extending in said lengthwise direction across said end member, and a second side surface spaced laterally from said first side surface and extending lengthwise across said end member.

5. An end member according to claim 4, wherein said channel bottom surface is disposed in axially-offset relation to said end wall in a direction opposite said base wall.

6. An end member according to claim 4, wherein said channel bottom surface, said first side surface and said second side surface are disposed in substantial alignment with one another such that said mounting channel has an approximately constant cross-sectional size and shape in said lengthwise direction across said end member.

7. An end member according to claim 4 further comprising a plurality of inner connector wall portions projecting axially from along at least one of said end wall and said base wall in an axial direction away from said base wall and toward a distal edge, said channel bottom surface being at least partially defined by said distal edges of said inner connector wall portions.

8. An end member according to claim 1, wherein said base wall extends radially outward and connects with said side wall.

9. An end member according to claim 1, wherein said side wall is an outer side wall, and said end member further comprises an inner side wall spaced radially inward from said outer side wall such that at least one base cavity is formed between said inner and outer side walls with said at least one base cavity being accessible from along a side of said end member toward said base wall.

10. An end member according to claim 9 further comprising a plurality of connector walls extending between and operatively interconnecting said inner side wall and said outer side wall.

11. A gas spring assembly comprising:
    a flexible wall at least partially formed from an elastomeric material and having a longitudinal axis, said flexible wall extending peripherally about said longitudinal axis and longitudinally between opposing first and second ends to at least partially define a spring chamber;
    a first end member secured across said first end of said flexible wall in a substantially fluid-tight manner;
    a jounce bumper disposed within said spring chamber and secured along said first end member; and,
    a second end member secured across said second end of said flexible wall in a substantially fluid tight manner, said second end member including:
        an end wall extending radially outward in a direction transverse to said longitudinal axis toward an outer peripheral edge, said end wall including an end wall surface dimensioned to abuttingly engage said flexible wall;
        a side wall extending from said end wall in an axial direction and dimensioned to receivingly engage said second end of said flexible wall;
        a base wall extending radially outward in a direction transverse to said axis, said base wall disposed in axially offset relation to said end wall such that said base wall can abuttingly engage said jounce bumper; and,
        a mounting channel extending into and across said second end member and at least partially defining a mounting surface for receivingly engaging an associated structural component with at least said end wall, said side wall and said base wall of said second end member being integrally formed from a unitary mass of polymeric material.

12. A gas spring assembly according to claim 11, wherein said flexible wall includes an end portion disposed along said side wall of said second end member with said end portion terminating at a mounting bead, and said mounting bead received along said side wall of said second end member such that a substantially fluid-tight seal is formed therebetween.

13. A gas spring assembly according to claim 11, wherein said second end member includes at least one cavity formed along said end wall with said at least one cavity being accessible from along a side of said end wall opposite said base wall.

14. A suspension system comprising:
    a pressurized gas system including a pressurized gas source and a control device; and,
    at least one gas spring assembly according to claim 11 disposed in fluid communication with said pressurized gas source through said control device.

15. An end member according to claim 11, wherein said side wall is an outer side wall, and said second end member further comprises an inner side wall spaced radially inward from said outer side wall such that at least one base cavity is formed between said inner and outer side walls with said at least one base cavity being accessible from along a side of said second end member toward said base wall.

16. An end member according to claim 15 further comprising a plurality of connector walls extending between and operatively interconnecting said inner side wall and said outer side wall.

17. A gas spring assembly comprising:
a flexible wall at least partially formed from an elastomeric material and having a longitudinal axis, said flexible wall extending peripherally about said longitudinal axis and longitudinally between opposing first and second ends to at least partially define a spring chamber;
a first end member secured across said first end of said flexible wall in a substantially fluid-tight manner; and,
a second end member secured across said second end of said flexible wall in a substantially fluid tight manner, said second end member including:
an end wall extending radially outward in a direction transverse to said longitudinal axis toward an outer peripheral edge, said end wall including an end wall surface dimensioned to abuttingly engage said flexible wall;
a side wall extending from said end wall in an axial direction and dimensioned to receivingly engage said second end of said flexible wall;
a base wall extending radially outward in a direction transverse to said axis, said base wall disposed in axially offset relation to said end wall; and,
a mounting channel extending into and across said second end member and at least partially defining a mounting surface for receivingly engaging an associated structural component with at least said end wall, said side wall and said base wall of said second end member being integrally formed from a unitary mass of polymeric material.

18. A gas spring assembly according to claim 17 further comprising a plurality of inner connector wall portions projecting axially from along at least one of said end wall and said base wall in an axial direction away from said base wall and toward a distal edge with a bottom surface of said mounting channel at least partially defined by said distal edges of said inner connector wall portions.

19. A gas spring assembly according to claim 17, wherein said side wall is an outer side wall, and said second end member further comprises an inner side wall spaced radially inward from said outer side wall such that at least one base cavity is formed between said inner and outer side walls with said at least one base cavity being accessible from along a side of said second end member toward said base wall.

20. An end member according to claim 19 further comprising a plurality of connector walls extending between and operatively interconnecting said inner side wall and said outer side wall.

* * * * *